US008981607B2

(12) United States Patent
Suga et al.

(10) Patent No.: US 8,981,607 B2
(45) Date of Patent: Mar. 17, 2015

(54) DRIVING APPARATUS

(75) Inventors: Yuuji Suga, Kariya (JP); Hiroshi Imai, Toyohashi (JP)

(73) Assignee: Denso Corporation, Kariya (JP)

( * ) Notice: Subject to any disclaimer, the term of this patent is extended or adjusted under 35 U.S.C. 154(b) by 281 days.

(21) Appl. No.: 13/611,071

(22) Filed: Sep. 12, 2012

(65) Prior Publication Data

US 2013/0099610 A1 Apr. 25, 2013

(30) Foreign Application Priority Data

Oct. 19, 2011 (JP) ................................. 2011-229651

(51) Int. Cl.
*H02K 11/00* (2006.01)

(52) U.S. Cl.
USPC .......................................................... 310/71

(58) Field of Classification Search
CPC .......... H02K 11/00; H02K 5/22; H02K 5/225
USPC ...................................... 310/71, 68 D, 88, 89
See application file for complete search history.

(56) References Cited

U.S. PATENT DOCUMENTS

| 5,770,902 | A | * | 6/1998 | Batten et al. ..................... 310/71 |
| 8,816,548 | B2 | * | 8/2014 | Tomizawa et al. .......... 310/68 D |
| 2002/0060105 | A1 | | 5/2002 | Tominaga et al. |
| 2003/0173920 | A1 | | 9/2003 | Tominaga et al. |
| 2005/0082925 | A1 | | 4/2005 | Yamamoto et al. |
| 2006/0267431 | A1 | * | 11/2006 | Johnson et al. ................. 310/89 |
| 2008/0150377 | A1 | * | 6/2008 | Yamaguchi et al. ............. 310/71 |
| 2009/0133955 | A1 | | 5/2009 | Morikawa et al. |
| 2009/0267430 | A1 | | 10/2009 | Imamura et al. |
| 2012/0229005 | A1 | | 9/2012 | Tominaga et al. |

FOREIGN PATENT DOCUMENTS

| JP | 2000-023408 | 1/2000 |
| JP | 2000-217310 | 8/2000 |
| JP | 2009-060746 | 3/2009 |
| JP | 2011-37324 | 2/2011 |

OTHER PUBLICATIONS

U.S. Appl. No. 13/611,092 of Suga et al., filed Sep. 12, 2012.
Office Action (2 pages) dated Sep. 30, 2014, issued in corresponding Japanese Application No. 2011-229639 and English translation (3 pages).
Office Action (7 pages) dated Aug. 13, 2014, issued in corresponding Chinese Application No. 201210337204.5 and English translation (10 pages).
Office Action (5 pages) dated Jan. 5, 2015, issued in corresponding Japanese Application No. 2011-229651 and English translation (5 pages).

* cited by examiner

*Primary Examiner* — Hanh Nguyen
(74) *Attorney, Agent, or Firm* — Nixon & Vanderhye PC (57) ABSTRACT

It is an object to provide a driving apparatus, according to which a control unit can be detachably connected to a motor unit in a condition that electronic circuits are not exposed to an outside of a housing. The electronic circuits are accommodated in the housing. A first connecting member is supported by a holder unit, which holds a motor terminal connected to a winding of a stator of the motor unit. A second connecting member is attached to the housing from the outside thereof, in such a way that a circuit-board terminal connected to the electronic circuits and the motor terminal are interposed between the first and second connecting members. As a result, the circuit-board terminal and the motor terminal are mechanically and electrically connected to each other.

7 Claims, 8 Drawing Sheets

DRIVING APPARATUS

CROSS REFERENCE TO RELATED APPLICATION

This application is based on Japanese Patent Application No. 2011-229651 filed on Oct. 19, 2011, the disclosure of which is incorporated herein by reference.

TECHNICAL FIELD

The present disclosure relates to a driving apparatus, in which an electric motor and a control unit for controlling an operation of the electric motor are integrally assembled together.

BACKGROUND

A driving apparatus for an electric power steering system (hereinafter EPS) is known in the art, according to which a steering operation of a vehicle driver is assisted by a driving force of an electric motor. Such a driving apparatus for the EPS is known in the art, according to which a mechanical unit (an electric motor) and an electrical unit (a control unit for controlling an operation of the electric motor) are integrally formed as one assembly unit.

According to a conventional driving apparatus, for example, as disclosed in Japanese Patent Publication No. 2011-37324 (A), motor terminals electrically connected to windings of an electric motor (corresponding to motor-side terminals 74U to 74W in the above patent publication) and circuit-board terminals connected to a circuit board of the control unit (corresponding to insert conductive members 52 in the above patent publication) are connected to each other (as disclosed in paragraph [0034] and shown in FIGS. 2 and 3 thereof).

Generally, when either one of the motor unit and the control unit goes out of order, in view of reducing a repairing cost, it is desirable to disassemble the control unit from the motor unit and to replace one of them, whichever is out of order, with a new component (a new control unit or a new motor unit).

According to the driving apparatus of the above patent publication, in a case that the control unit is disassembled from and re-assembled to the motor unit, the motor terminals are disconnected from and then connected again to the circuit-board terminals. During such a disassembling or re-assembling process, the circuit board of the control unit is inevitably exposed to an outside of a housing for the control unit.

As a result, any extraneous material may enter into an inside of the control unit and may adhere to an electronic circuit formed on the circuit board. In addition, there is a fear that the electronic circuit may be damaged by a tool, by which the motor terminals are connected to or disconnected from the circuit-board terminals. Furthermore, there is a fear that the electronic circuit may be damaged, when static electricity flows to the electronic circuit from a hand of a repairing worker.

SUMMARY OF THE DISCLOSURE

The present disclosure is made in view of the above points. It is an object of the present disclosure to provide a driving apparatus, according to which a control unit can be disassembled from and re-assembled to a motor unit, while preventing an electronic circuit from being exposed to an outside of a housing for the control unit.

According to a feature of the present disclosure, for example, as defined in claim 1, a driving apparatus is composed of a motor unit, a control unit, circuit-board terminals, motor terminals and connecting devices.

The motor unit has;
a cylindrical motor casing for forming an outer frame;
a stator provided in a radial inside of the motor casing and having multiple-phase windings wound on the stator; and
a rotor rotatably accommodated in a radial inside of the stator.

The control unit has;
driving elements for supplying electric power to the windings of the stator;
circuit boards having electronic circuits electrically connected to the driving elements; and
a housing covering and protecting the electronic circuits,
wherein the control unit is detachably attached to an axial end of the motor casing.

Multiple circuit-board terminals are electrically connected to the electronic circuits formed on the circuit boards. Multiple motor terminals are electrically connected to the respective windings of the stator, wherein each motor terminal extends toward the corresponding circuit-board terminal.

The driving apparatus further has multiple connecting devices, by means of which the motor terminal is connected to or disconnected from the corresponding circuit-board terminal in an inside or at an outside of the housing, in a condition that the electronic circuits are covered by the housing.

During a disassembling and/or an assembling process of the control unit and the motor unit, it is possible to avoid such a situation that the circuit boards are exposed to the outside of the housing. As a result, it is possible to prevent any extraneous material from entering the inside of the housing and adhering to the electronic circuits. In addition, it is possible to prevent the electronic circuits from being damaged by a tool, by which the circuit-board terminals are connected to or disconnected from the motor terminals.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained by way of multiple embodiments with reference to the drawings. The same reference numerals are used throughout the embodiments for the purpose of designating the same or similar parts and components.

First Embodiment

A driving apparatus 1 of a first embodiment of the present disclosure will be explained with reference to FIGS. 1 to 8. The driving apparatus 1 is applied to an electrical power steering device (EPS) for a vehicle.

Figure 1:
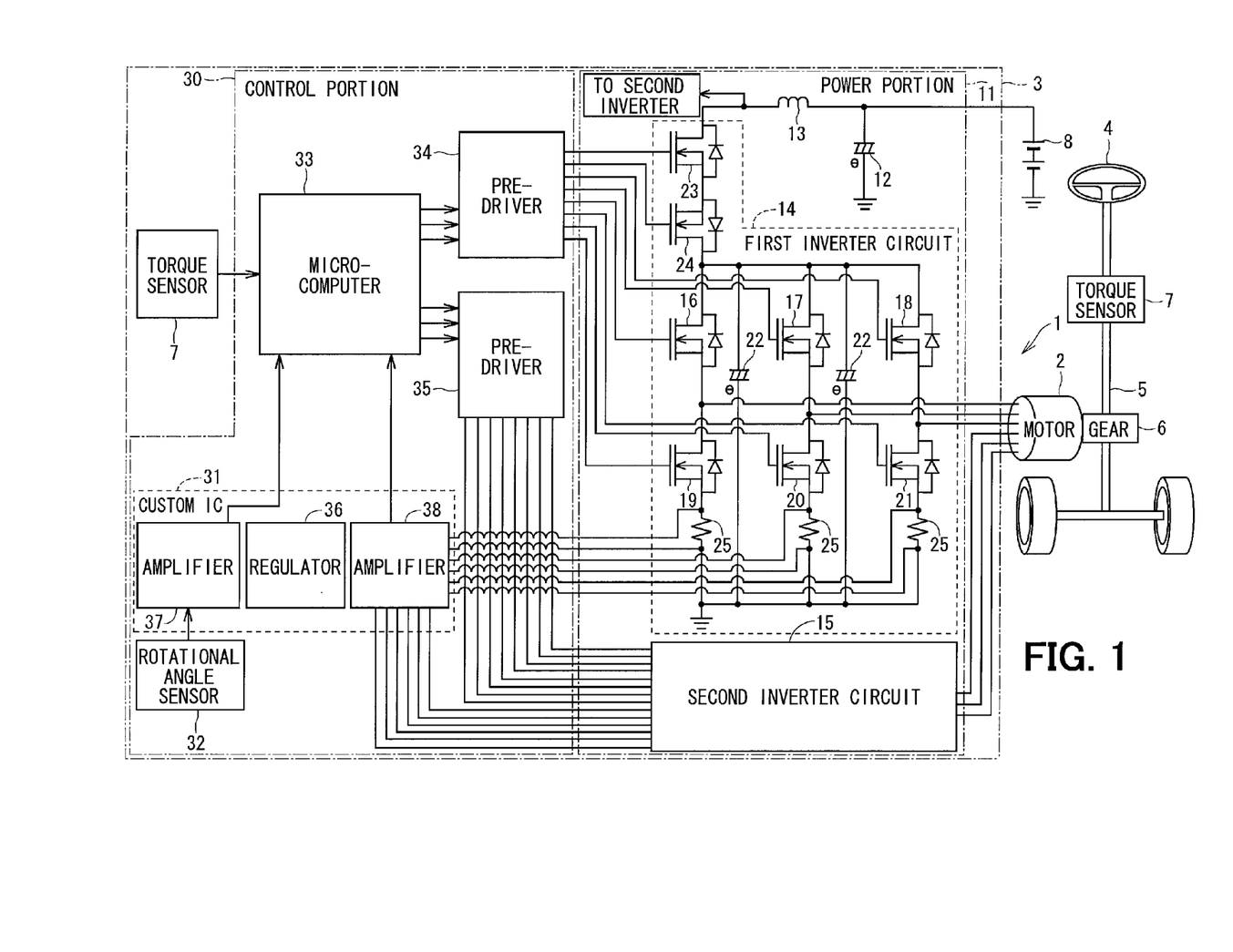
FIG. 1 is a schematic diagram showing a structure of a power steering apparatus for a vehicle according to a first embodiment of the present disclosure.
Figure 2:
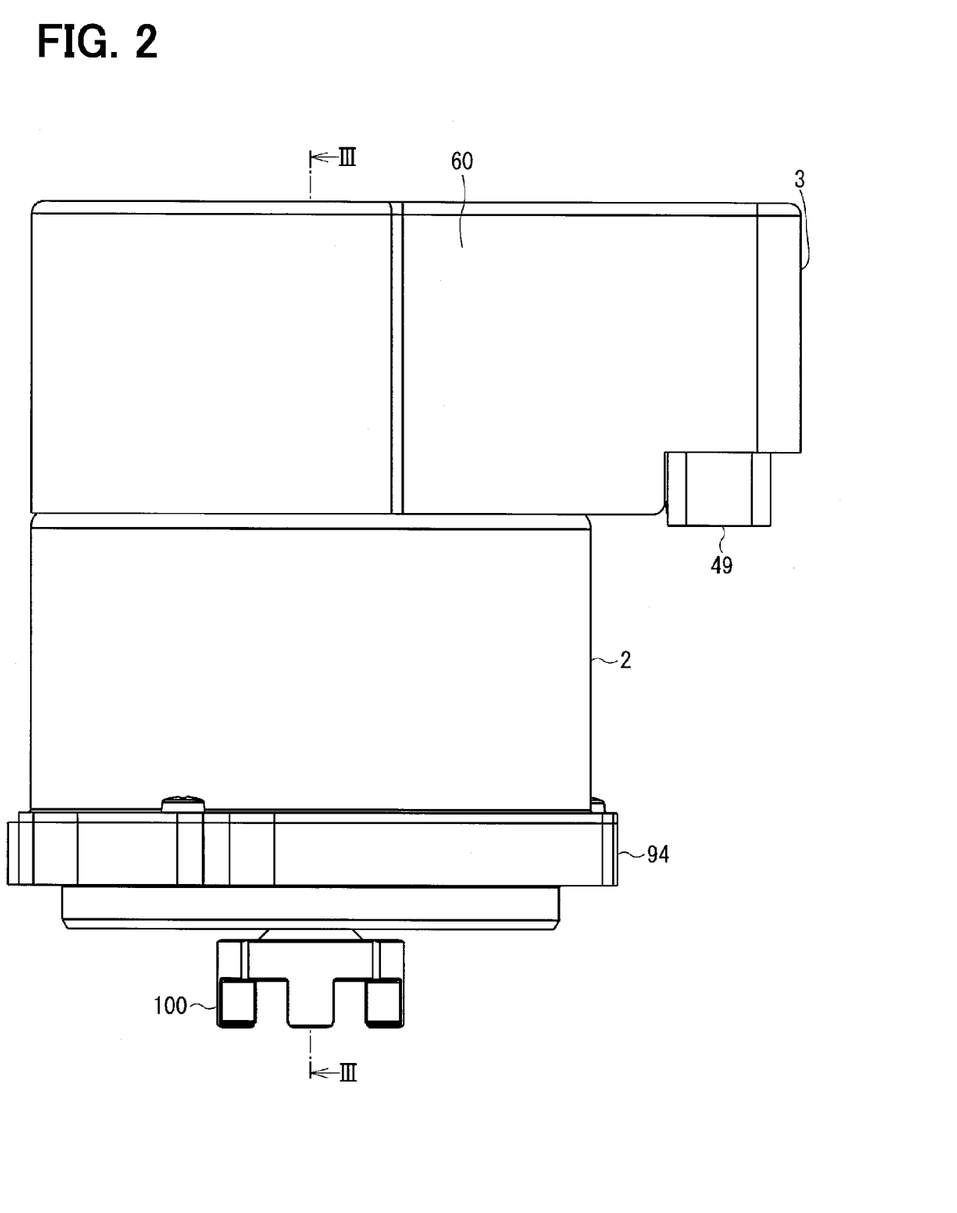
FIG. 2 is a schematic side view showing a driving apparatus of the first embodiment.

As shown in FIGS. 1 and 2, the driving apparatus 1 is composed of a motor unit (including an electric motor 2) and a control unit 3. An output portion 100 of the electric motor 2 is engaged with a speed-reduction gear 6, which rotates a steering shaft 5 connected to a steering wheel 4 of the vehicle.

When the steering wheel 4 is operated by a vehicle driver, a steering torque generated in the steering shaft 5 is detected by a torque sensor 7. The driving apparatus 1 generates a rotational torque for assisting a steering operation of the steering wheel 4 by the vehicle driver based on a signal outputted from the torque sensor 7 as well as other information (including a vehicle speed) transmitted via a CAN (Control Area Network: not shown). The rotational torque is transmitted to the steering shaft 5 via the speed-reduction gear 6.

An electrical structure of the control unit 3 will be explained with reference to FIG. 1. The control unit 3 is composed of a driving power portion 11, through which driving current for the electric motor 2 flows, and a control portion 30 for controlling an operation of the driving power portion 11. The control unit 3 controls a driving operation of the electric motor 2.

The driving power portion 11 is composed of a first capacitor 12, a choke coil 13, switching elements 16 to 21 for forming a first inverter circuit 14, second capacitors 22 and so on. The switching elements 16 to 21 are also referred to as "driving elements".

Electric power is supplied to the driving power portion 11 from a battery (a power source) 8, which is provided at an outside of the driving apparatus 1. The first capacitor 12 and the choke coil 13 provided in the driving power portion 11 form a filter circuit for reducing noises, which may be transmitted to the driving power portion 11 from other electronic devices commonly having the battery 8 and/or which may be transmitted from the driving power portion 11 to the other electronic devices. The choke coil 13 is connected in series between the battery 8 and power-source relays 23 and 24 so as to attenuate fluctuation in voltage.

The driving power portion 11 has a pair of (first and second) inverter circuits 14 and 15. Since structures of the inverter circuits 14 and 15 are identical to each other, explanation will be made only for the first inverter circuit 14.

Each of the power-source relays 23 and 24 as well as the switching elements 16 to 21 is formed of a MOSFET (a metal-oxide-semiconductor field-effect transistor, hereinafter referred to as a MOS transistor). In the MOS transistor, a source-drain path is turned on or turned off depending on a gate potential. The power-source relays 23 and 24 are provided between the switching elements 16 to 21 and the choke coil 13 in order to cut off electric current to the electric motor 2 via the switching elements 16 to 21 in a case of an abnormal condition.

Each drain of three switching elements 16 to 18 on a power-source side is connected to a power-supply line, while each source thereof is respectively connected to each drain of other three switching elements 19 to 21 on a ground side. Each source of the other three switching elements 19 to 21 on the ground side is connected to the ground via each shunt resistor 25. Each connecting point between the three switching elements 16 to 18 on the power-source side and the other three switching elements 19 to 21 on the ground side is respectively connected to each three-phase winding 95 (FIG. 3) of the electric motor 2.

The shunt resistor 25 is connected between each switching element 19 to 21 and the ground. Electric potential between both ends of each shunt resistor 25 or electric current flowing through each of the shunt resistors 25 is detected so as to detect the driving current supplied to the electric motor 2.

Each of the second capacitors 22 is connected between the power-supply line for the switching elements 16 to 18 and a ground line for the switching elements 19 to 21. In other words, the second capacitors 22 are connected in parallel to the switching elements 16 to 21. The capacitors 22 store electric charge so as to assist power supply to the switching elements 16 to 21 and/or absorb ripple current which may be generated when the driving current to the electric motor is switched over.

The control portion 30 is composed of a custom IC 31, a rotational angle sensor 32, a micro-computer 33, pre-driver circuits 34 and 35 and so on.

The custom IC 31 is a semiconductor integrated circuit, including a regulator 36, an amplifying portion 37 for a rotational-angle sensor signal, an amplifying portion 38 for detected voltage and so on.

The regulator 36 is a stabilization circuit for stabilizing the power supply from the battery 8 to the respective portions. For example, the micro-computer 33 operates with a stabilized predetermined voltage (for example, 5 volt) from the regulator 36.

The sensor signal from the rotational angle sensor 32 is inputted to the amplifying portion 37. The rotational angle sensor 32 is provided in a magnetic field of a magnet 99 (FIG. 3), which is attached to a shaft 93 (FIG. 3) of the electric motor 2, so as to detect a change of the magnetic field surrounding the sensor. The sensor signal of the rotational angle sensor 32 is supplied to the amplifying portion 37 as a signal representing a rotational position of a rotor 92 of the electric motor 2. The sensor signal for the rotational angle is amplified by the amplifying portion 37 and then supplied to the micro-computer 33.

The amplifying portion 38 detects the voltage across the shunt resisters 25 and amplifies the detected voltage to output it to the micro-computer 33.

The micro-computer 33 has a CPU as a calculating portion and a ROM, a RAM or the like as a memory device. Input signals, such as the sensor signal for the rotational position of the rotor 92, the voltage across the shunt resisters 25, a sensor signal for the steering torque, the information of the vehicle speed and so on are inputted into the micro-computer 33 respectively from the amplifying portion 37 for the rotational angle sensor 32, the amplifying portion 38 for the detected voltage, the torque sensor 7 and CAN.

The micro-computer 33 produces a pulse signal, which is formed by a PWM control, from the pre-driver circuits 34 and 35 based on the rotational angle of the rotor 92 of the electric motor 2, when the above input signals are inputted. The driving apparatus 1 assists the operation of the steering wheel 4 depending on the vehicle speed. The pulse signal controls switching operations (on-off operations) of the switching elements 16 to 21 of the two systems of the inverter circuits 14 and 15.

In addition, the micro-computer 33 controls the inverter circuits 14 and 15 based on the voltage across the shunt resistors 25 from the amplifying portion 38 for detected-voltage, so as to generate electric current of a substantially sinusoidal waveform, which is supplied to the electric motor 2. As a result, different phase driving currents of the sinusoidal waveform are supplied to the electric motor 2, so that a rotating magnetic field is generated in the windings 95 of a stator 91 of the electric motor 2. The electric motor 2 generates a torque by the rotating magnetic field, so that the operation of the steering wheel 4 by the vehicle driver is assisted.

A structure of the control unit 3 will be then explained. As shown in FIG. 2, the control unit 3 is provided at one axial end of the electric motor 2.

Figure 3:
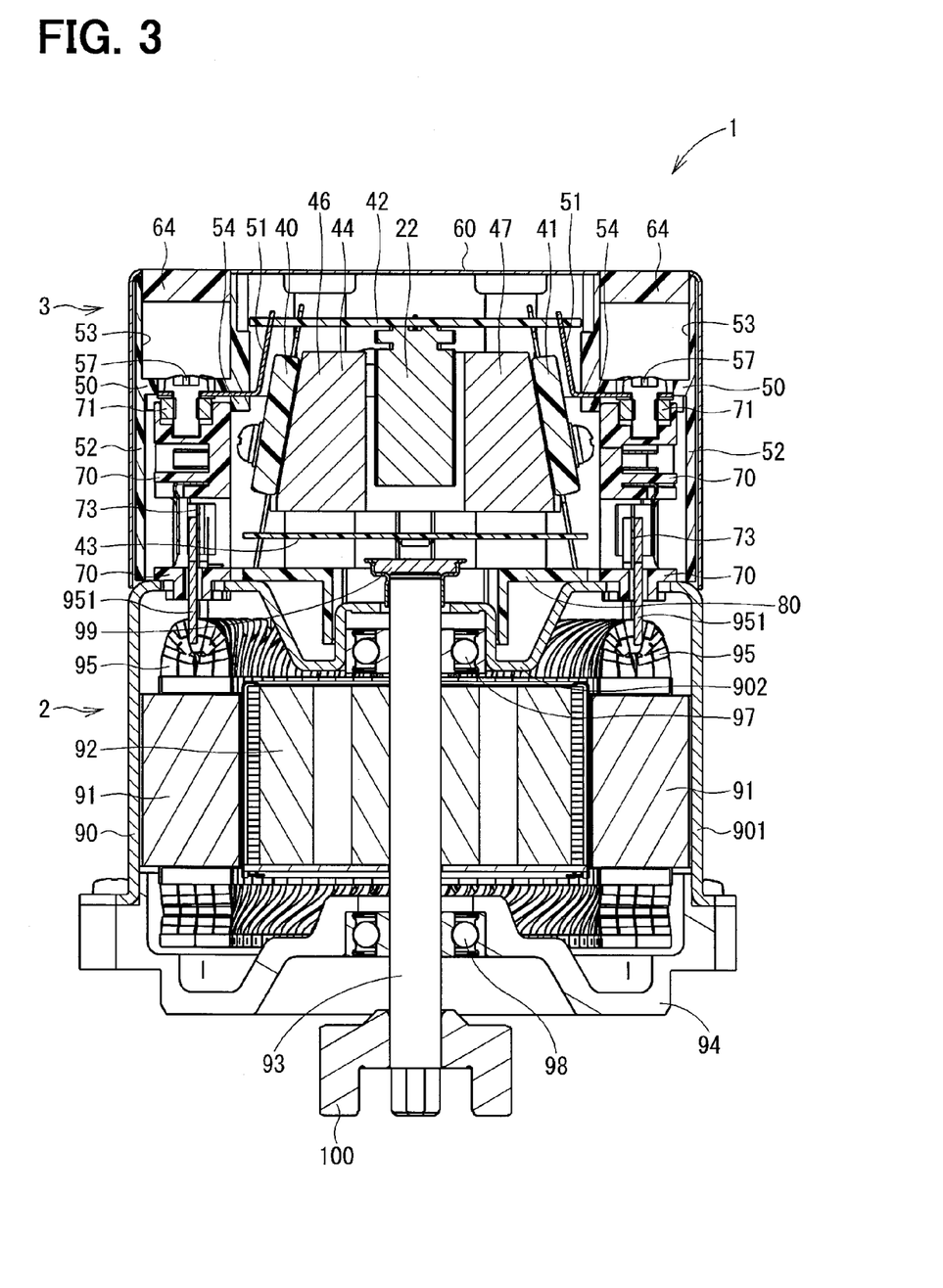
FIG. 3 is a cross sectional view taken along a line III-III in FIG. 2.
Figure 4:
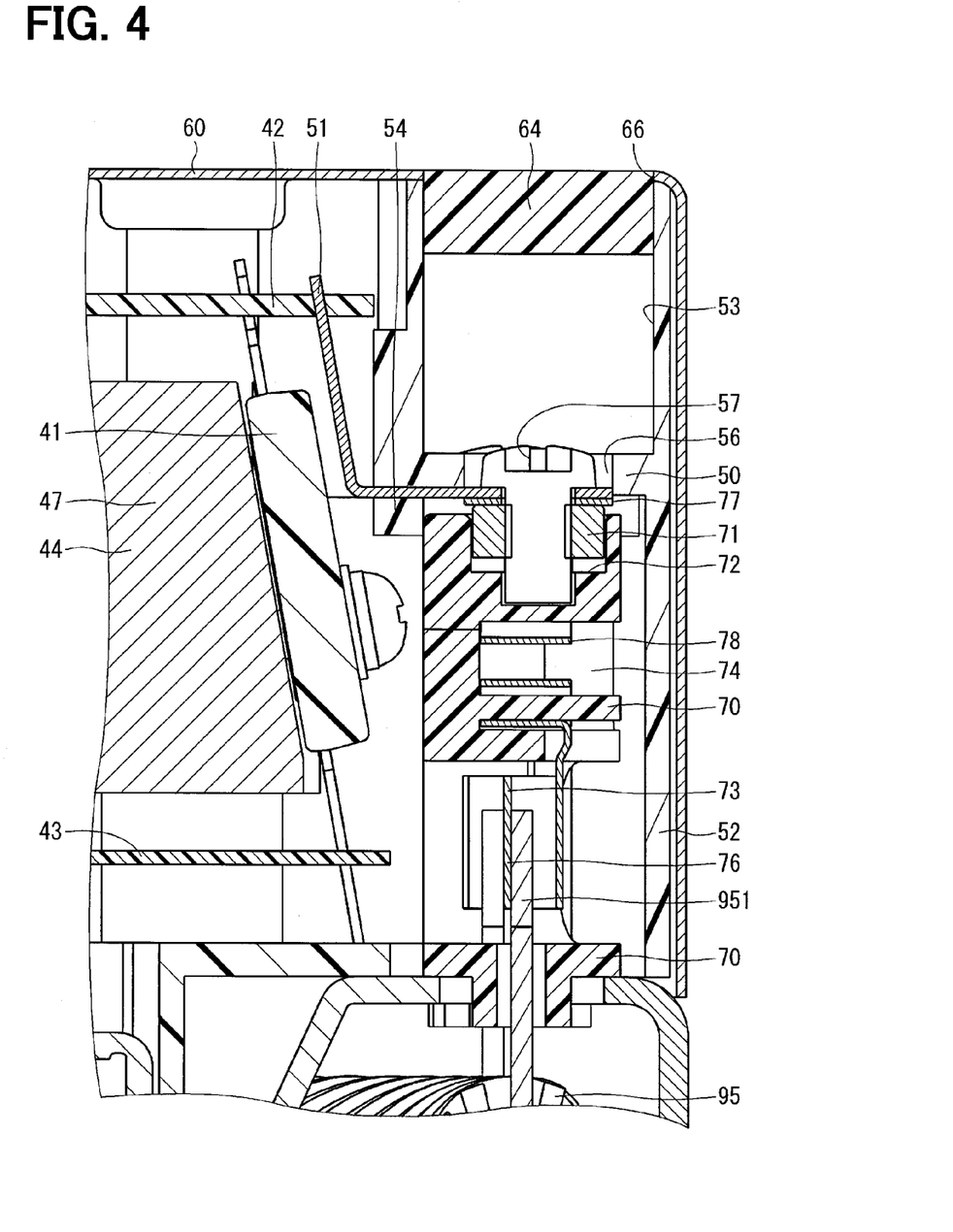
FIG. 4 is an enlarged cross sectional view showing a relevant portion of a control unit of the driving apparatus.
Figure 5:
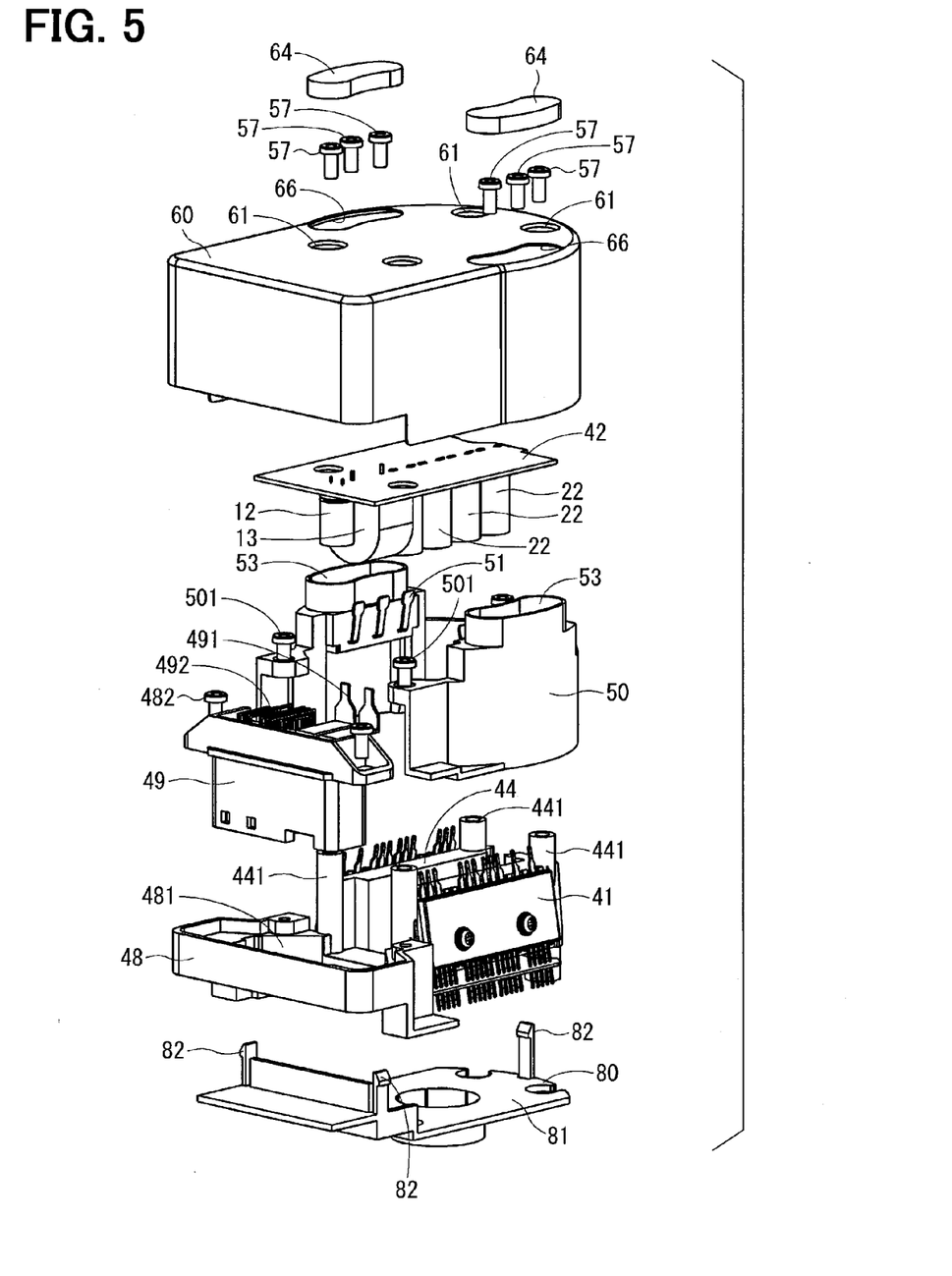
FIG. 5 is an exploded perspective view schematically showing the driving apparatus of the first embodiment.
Figure 6:
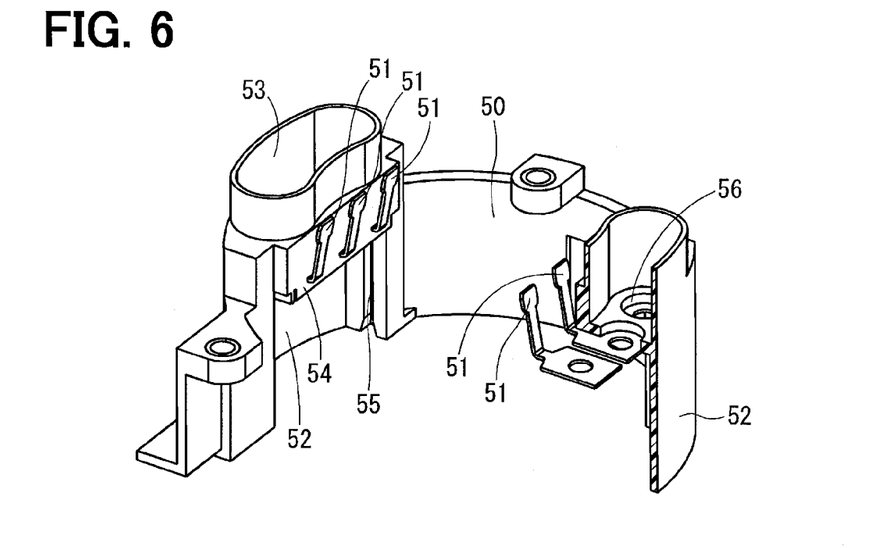
FIG. 6 is a schematic perspective view showing a relevant portion of a component carrier unit of the driving apparatus.

As shown in FIGS. 3 to 5, the control unit 3 is composed of a pair of power modules 40 and 41, a power circuit board 42, a control circuit board 43, a heat sink 44, a component carrier unit 50, an outside cover member 60 and so on.

One of the power modules (the power module 40) is formed of a sealed body, in which the parts and components for the first inverter circuit 14 (including the power-source relays 23 and 24, the switching elements 16 to 21, the shunt resisters 25, wiring patterns for electrically connecting them with each other, and so on) are covered with and sealed by sealing material, such as resin. In a similar manner, the other power module 41 is formed of a sealed body, in which switching elements and other electrical parts and components for the second inverter circuit 15 are covered with and sealed by sealing material (for example, resin). The power modules 40 and 41 are formed in the substantially identical structure to each other.

The above first capacitor 12, the choke coil 13, the second capacitors 22 and other parts, which form the driving power portion 11, are mounted to the power circuit board 42. In addition, wiring patterns, through which the electric current flows from the battery 8 to the three-phase windings 95 of the electric motor 2 via the switching elements 16 to 21 of the power modules 40 and 41, are formed in the power circuit board 42. As above, the power circuit board 42 forms an electronic circuit, through which large driving current flows from the battery 8 to the electric motor 2.

On the other hand, the custom IC 31, the rotational angle sensor 32, the micro-computer 33, the pre-driver circuits 34 and 35 and so on, which form the control portion 30, are mounted to the control circuit board 43. In addition, wiring patterns, through which signals for controlling switching operations (the on-off operations) of the switching elements 16 to 21 of the power modules 40 and 41 are transmitted, are formed in the control circuit board 43. As above, the control circuit board 43 forms an electronic circuit, which controls the switching operations of the switching elements 16 to 21.

The power circuit board 42 and the control circuit board 43 are collectively referred to as "the circuit boards".

The heat sink 44 is made of material having high heat conductivity, such as aluminum, for absorbing heat generated at the power modules 40 and 41. The heat sink 44 is composed of a pair of blocks 46 and 47, which are arranged so as to oppose to each other across a center axis of a motor casing 90. The power module 40 is fixed to an outer wall of one of the blocks (the block 46), while the other power module 41 is fixed to an outer wall of the other block 47.

The power circuit board 42 is located at one axial end of the heat sink 44, which is on a side opposite to the electric motor 2 (that is, a side away from the electric motor 2), while the control circuit board 43 is located at the other axial end of the heat sink 44, which is on a side of the electric motor 2 (that is, a side closer to the electric motor). The second capacitors 22 are arranged between the blocks 46 and 47.

As shown in FIG. 5, a connector holding unit 48, which is integrally formed with the heat sink 44, is projected from the heat sink 44 in a radial outward direction of the motor casing 90. A connector accommodating space 481, which extends in an axial direction of the motor casing, is formed in the connector holding unit 48.

An inside connector unit 49 is inserted into the connector accommodating space 481 and fixed to the connector holding unit 48 by screws 482. The inside connector unit 49 includes power terminals 491 and control terminals 492. Each one end of the power terminals 491 extends into an inside of the inside connector unit 49, while each other end thereof is connected to the wiring patterns of the power circuit board 42. In a similar manner, each one end of the control terminals 492 extends into the inside of the inside connector unit 49, while each other end thereof is connected to the wiring patterns of the control circuit board 43.

Figure 7:
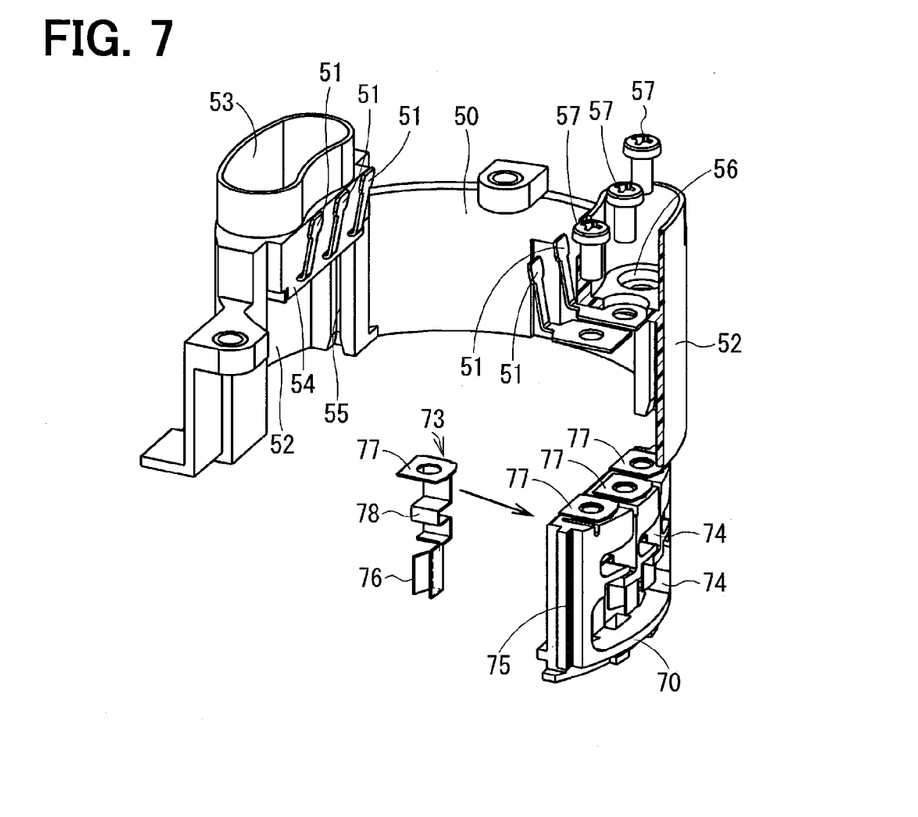
FIG. 7 is a schematic perspective view showing relevant portions of the component carrier unit, a holder unit and motor terminals of the driving apparatus.

As shown in FIGS. 3 and 4, a coil end 951 of each winding 95 wound on the stator 91 of the electric motor 2 passes through an opening of the motor casing 90 and extends in an axial direction of the electric motor 2 toward the control unit 3. A holder unit 70 is provided in each opening of the motor casing 90. The holder unit 70 is made of resin and has multiple nut-receiving portions 72, into which each nut 71 is respectively inserted, and multiple grooves 74 for respectively holding motor terminals 73. As shown in FIG. 7, the holder unit 70 has a pair of projected portions 75 at its circumferential side walls, wherein each projected portion 75 extends in the axial direction of the motor casing 90. In FIG. 7, only one projected portion 75 is shown.

Each of the motor terminals 73 is inserted into the groove 74 of the holder unit 70. The motor terminal 73 has a clipping portion 76 for clipping the coil end 951, a contacting portion 77 which is brought into contact with a corresponding circuit-board terminal 51, and a bent portion 78 being bent at a portion between the clipping portion 76 and the contacting portion 77. When the clipping portion 76 clips the coil end 951, the motor terminal 73 is mechanically and electrically connected to the coil end 951. The contacting portion 77 is located at a position of the nut 71 accommodated in the nut-receiving portion 72 on a side to the circuit-board terminal 51.

As shown in FIGS. 3 to 7, the component carrier unit 50 is made of resin and arranged at an outer side of the heat sink 44. The component carrier unit 50 is fixed to the heat sink 44 by screws 501.

The component carrier unit 50 is composed of a pair of holder supporting portions 52, a pair of recessed portions 53 and a pair of fixing portions 54, which are integrally formed with one another.

Each holder supporting portion 52 covers an outer side of each holder unit 70. A pair of long groove portions 55 is formed at an inner wall of the holder supporting portion 52 (at circumferential sides thereof), wherein each long groove portion 55 extends in the axial direction of the motor casing 90. When the projected portions 75 of the holder unit 70 are inserted into in the axial direction and fitted to the long groove portions 55 of the holder supporting portion 52, each holder unit 70 is positioned to the respective holder supporting portion 52.

Each of the recessed portions 53 is formed on an axial end of the component carrier unit 50 opposite to the electric motor 2 and recessed in the axial direction toward the electric motor 2.

An outer peripheral shape of the recessed portion 53 is formed so as to correspond to an inner wall shape of the outside cover member 60, when viewed in an axial direction of the control unit 3. Multiple (three) through-holes 56 are formed at a bottom of each recessed portion 53, through which an inside and an outside of the component carrier unit 50 are communicated with each other.

The circuit-board terminals 51 are molded in the respective fixing portions 54. Each one end of the circuit-board terminal 51 is connected to the power circuit board 42, while each other end thereof is exposed to an outside of the fixing portion 54 at the bottom of the recessed portion 53 at the corresponding through-hole 56. Namely, one side surface of each other end of the circuit-board terminal 51 (that is, a lower side surface in FIG. 4 or 7, for example) is in contact with the corresponding contacting portion 77 of the motor terminal 73.

Multiple bolts 57 are inserted into the respective through-holes 56 formed at the bottom of each recessed portion 53 of the component carrier unit 50. The bolts 57 are screwed into the corresponding nuts 71 (which are accommodated in the nut-receiving portions 72 of the respective holder units 70), so that each circuit-board terminal 51 and each motor terminal 73 are interposed between the respective bolts 57 and nuts 71. According to such a structure, the circuit-board terminals 51 and the motor terminals 73 are mechanically and electrically connected to each other so as to supply the electric power to the windings 95 of the electric motor 2 via the switching elements 16 to 21.

Each pair of the nut 71 and the bolt 57 is also referred to as "a connecting device", wherein the nut 71 is further referred to as "a first connecting member", while the bolt 57 is further referred to as "a second connecting member".

Figure 8:
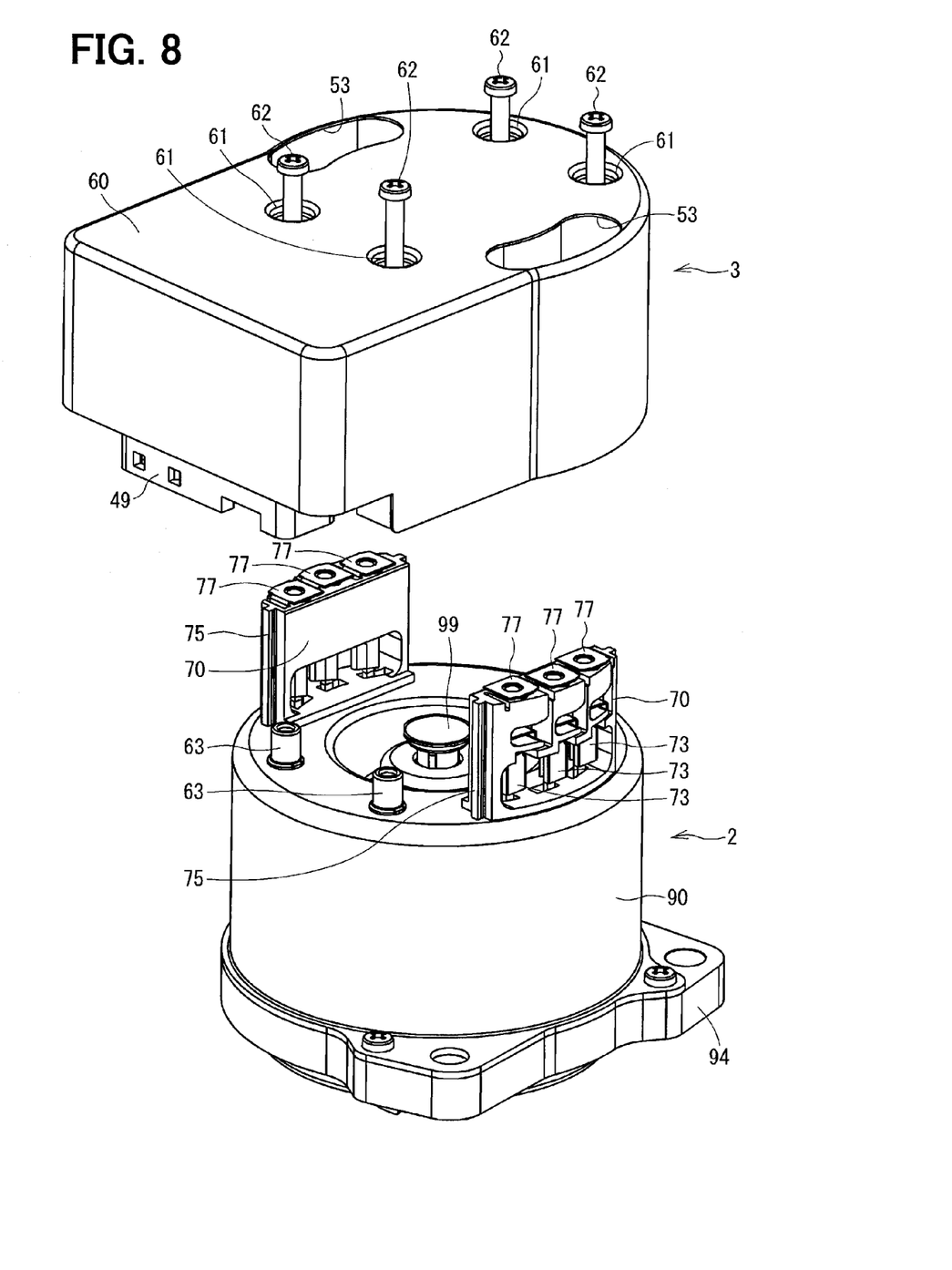
FIG. 8 is an exploded perspective view showing the control unit and a motor unit (including an electric motor) of the driving apparatus.

The outside cover member 60 is made of resin or metal and formed in a cylindrical shape having a closed end. The outside cover member 60 is attached to the electric motor 2 for covering the component carrier unit 50 and so on. As shown in FIG. 8, multiple through-bolts 62 are inserted into respective through-holes 61 formed in the outside cover member 60. Each of the through-bolts 62 passes through a cylindrical portion 441 formed in the heat sink 44 and is screwed into respective female screw 63 formed in the motor casing 90.

The component carrier unit 50 and the outside cover member 60 are collectively referred to as "a housing".

A lower-side cover member 80 is arranged at a side of the control circuit board 43 facing to the electric motor 2. The lower-side cover member 80 is fixed to the heat sink 44 by multiple claw portions 82, each of which extends in an axial and upward direction from a cover plate 81 (in a direction perpendicular to the cover plate 81).

A structure of the motor unit (the electric motor 2) will be explained with reference to FIG. 3.

The electric motor 2 is composed of the motor casing 90, the stator 91, the rotor 92, the shaft 93 and so on.

The motor casing 90 is made of an iron plate by press work and is formed in a cylindrical shape having a closed end. The motor casing 90 forms an outer frame of the electric motor 2. The motor casing 90 is composed of a cylindrical wall 901 and a bottom wall 902 extending in a radial inward direction from the cylindrical wall 901. An end frame 94 is attached to the motor casing 90 at an open end of the cylindrical wall 901 to close it.

The stator 91 is fixed to an inner wall surface of the cylindrical wall 901. The stator 91 is composed of multiple laminated steel plates and has multiple projected pole portions and multiple slots (not shown), which are alternately arranged in a circumferential direction of the stator 91. The multiple windings 95 are accommodated in the slots of the stator 91. Each of the windings 95 is wound on the respective projected pole portions. The windings 95 form two systems of three-phase windings. Each coil end 951 of the windings 95 outwardly extends from the bottom wall 902 toward the control unit 3 and is connected to the respective motor terminals 73.

The rotor 92 is made of multiple laminated steel plates and arranged in an inside of the stator 91 so that the rotor 92 is rotated in the inside of the stator 91. Multiple magnetic poles (north and south poles) are alternately formed at an outer periphery in its circumferential direction of the rotor 92. The shaft 93 is firmly fixed to a center hole formed in the rotor 92. One end (an upper end in FIG. 3) of the shaft 93 is rotatably supported by a bearing 97 provided at the bottom wall 902 of the motor casing 90 and the other end of the shaft 93 is rotatably supported by a bearing 98 provided in the end frame 94, so that the rotor 92 is rotatably accommodated in the motor casing 90. The magnet 99 is provided at the upper end of the shaft 93 (on the side facing to the control circuit board 43), so that the rotational position of the shaft 93 (the rotational position of the rotor 92) can be detected.

When the electric power is supplied from the switching elements 16 to 21 to the windings 95 of the stator 91, the rotating magnetic field is generated so that the shaft 93 and the rotor 92 are rotated in a forward or a backward direction with respect to the stator 91 and the motor casing 90. The driving force is then outputted from the output portion 100 (the lower end of the shaft 93) to the speed-reduction gear 6 of the column shaft 5.

A manufacturing method for the driving apparatus 1 will be explained with reference to FIGS. 5 to 8.

At first, the power modules 40 and 41, the power circuit board 42 to which the electronic parts are mounted, the control circuit board 43 (to which the electronic parts are likewise mounted), the component carrier unit 50, the inside connector unit 49 and the lower-side cover member 80 are assembled to the heat sink 44. During the assembling process, the circuit-board terminals 51 molded with the component carrier unit 50 are connected to the wiring patterns of the power circuit board 42 by welding, soldering or the like.

Then, the outside cover member 60 is attached to the heat sink 44, to which the power circuit board 42, the control circuit board 43, the component carrier unit 50, the inside connector unit 49 and the lower-side cover member 80 have been assembled.

The holder units 70, to which the motor terminals 73 and the nuts 71 are assembled, are attached to the motor casing 90. The coil ends 951 of the windings 95 of the stator 91 are respectively connected to the clipping portions 76 of the motor terminals 73.

Then, as shown in FIG. 8, the control unit 3 is connected to the electric motor 2. In this connecting process, the holder units 70 attached to the motor casing 90 are inserted into an inside of the respective holder supporting portions 52 of the component carrier unit 50. More exactly, the projected portions 75 of the holder units 70 are inserted into the respective long groove portions 55 of the holder supporting portions 52. Then, the circuit-board terminals 51 are brought into contact with the respective contacting portions 77 of the motor terminals 73.

The bolts 57 are inserted into the through-holes 56 formed at the bottoms of the recessed portions 53 of the component carrier unit 50 and the bolts 57 are screwed to the nuts 71 fixed to the holder units 70. When the bolts 57 are rotated, the nuts 71 are moved toward the recessed portions 53, so that the circuit-board terminals 51 and the motor terminals 73 are respectively connected to each other mechanically and electrically.

Then, a cap member 64 is attached to each opening 66, which is formed in the outside cover member 60 at such a portion corresponding to each recessed portion 53 of the component carrier unit 50. The cap member 64 is made of, for example, rubber.

Thereafter, the through-bolts 62 are inserted into the respective through-holes 61 formed in the outside cover member 60, so as to fix the outside cover member 60 and the heat sink 44 to the motor casing 90. The through-bolts 62 pass through the respective cylindrical portions 441 of the heat sink 44 and are firmly fixed to the female screws 63 formed in the motor casing 90. Thus, the driving apparatus 1 is completed.

Now, a method for taking apart the control unit 3 from the motor unit (the electric motor 2) will be explained.

At first, the cap members 64 are uncovered from the outside cover member 60.

Then, a tool, such as a screw driver is inserted into the recessed portions 53 of the component carrier unit 50 in order to take out the bolts 57. The circuit-board terminals 51 are thereby disconnected from the motor terminals 73.

Subsequently, the through-bolts 62 are taken out so that the control unit 3 is separated from the motor unit (the electric motor 2).

The present embodiment has the following advantages.

According to the present embodiment, the circuit-board terminals 51 can be connected to and/or disconnected from the motor terminals 73, when the bolts 57 provided in the inside of the respective recessed portions 53 are screwed to or unscrewed from the nuts 71. During the process of screwing or unscrewing the bolts 57, it is possible to avoid such a situation that the power circuit board 42, the control circuit board 43, the circuit-board terminals 51 and the motor terminals 73 are exposed to an outside of the outside cover member 60 (the housing). As a result, it is possible to prevent any extraneous material from entering the inside of the outside cover member 60 and adhering to the electronic circuits provided on the power circuit board 42 and/or the control circuit board 43, when the control unit 3 is assembled to or disassembled from the electric motor 2, namely when the circuit-board terminals 51 are connected to or disconnected from the motor terminals 73. In addition, it is possible to prevent the electronic circuits from being damaged by the tool, by which the circuit-board terminals 51 are connected to or disconnected from the motor terminals 73. Furthermore, it is possible to prevent the electronic circuits from being damaged by static electricity, which may possibly flow to the electronic circuits from a hand of a repairing worker via the circuit-board terminals 51 and/or the motor terminals 73.

According to the present embodiment, the bolts 57 for connecting the circuit-board terminals 51 to the motor terminals 73 are accommodated in the recessed portions 53. The cap members 64 cover the openings 66 formed in the outside cover member 60 at such portions corresponding to the recessed portions 53. Accordingly, it is possible to prevent the electric current from flowing from the bolts 57 to the electronic circuits via the circuit-board terminals 51.

According to the present embodiment, the circuit-board terminals 51 are fixed to the component carrier unit 50 and the motor terminals 73 and the nuts 71 are positioned in the holder units 70. It is, therefore, possible to push the bolts 57 from the recessed portions 53 into the inside of the component carrier unit 50 and thereby easily connect (or disconnect) the bolts 57 to the nuts 71 in the inside of the component carrier unit 50.

Second Embodiment

Figure 9:
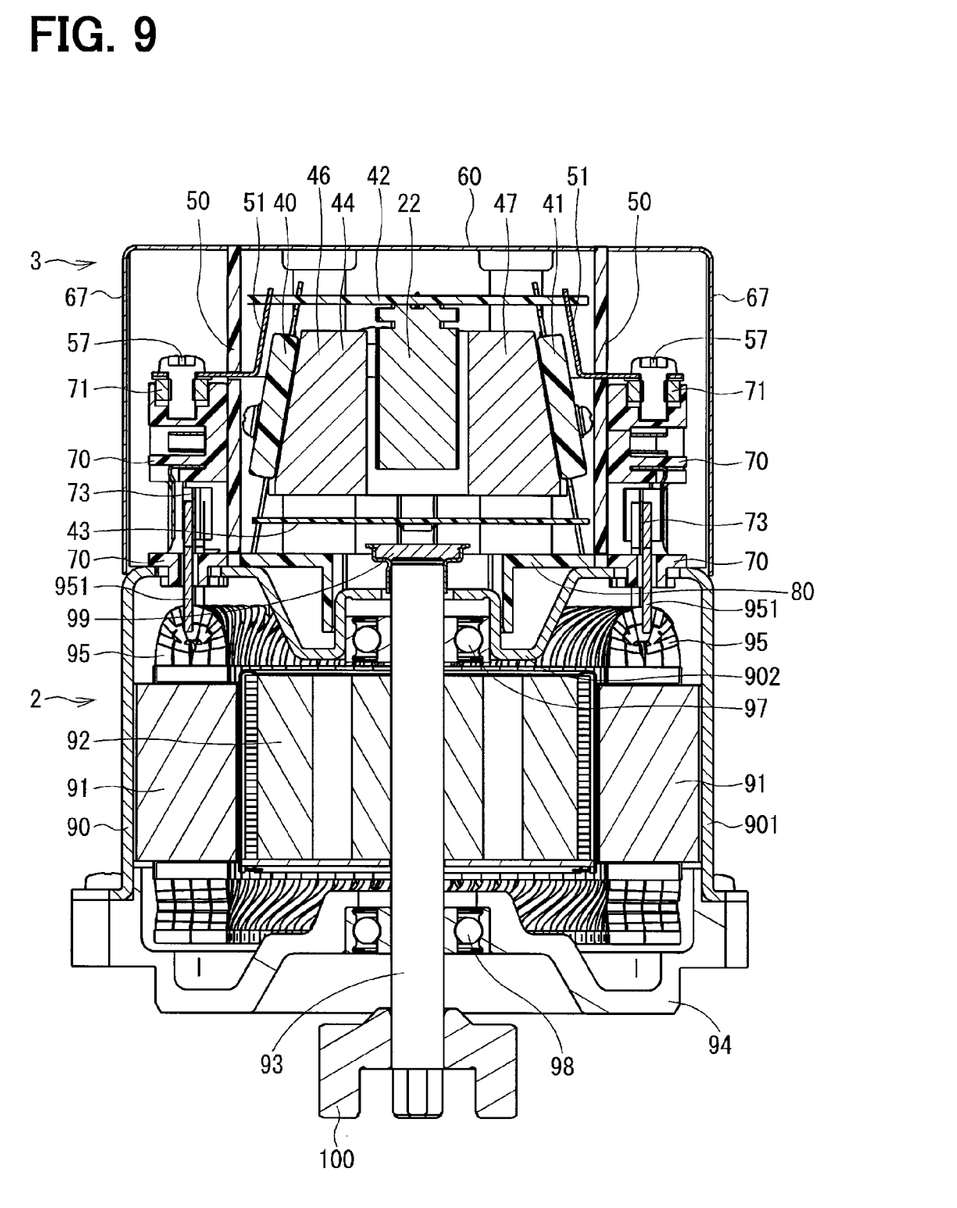
FIG. 9 is a cross sectional view showing a driving apparatus according to a second embodiment of the present disclosure.

A driving apparatus according to a second embodiment of the present disclosure is shown in FIG. 9.

According to the second embodiment, the component carrier unit 50 and the outside cover member 60 do not cover the circuit-board terminals 51, the motor terminals 73 and the holder units 70, but the component carrier unit 50 and the outside cover member 60 cover the power circuit board 42, the control circuit board 43, the power modules 40 and 41 and so on. Side cover members 67 are attached to outside portions of the component carrier unit 50.

The bolts 57 are screwed to the nuts 71 at the outside of the component carrier unit 50, so that the circuit-board terminals 51 and the motor terminals 73 are mechanically and electrically connected to each other.

According to the second embodiment, it is possible to connect the circuit-board terminals 51 to the motor terminals 73 or to disconnect the circuit-board terminals 51 from the motor terminals 73, in a condition that the side cover members 67 are uncovered from the outside cover member 60, when the control unit 3 is assembled to or disassembled from the motor unit (the electric motor 2). During the connecting or disconnecting process between the circuit-board terminals 51 and the motor terminals 73, it is possible to avoid such a situation that the electronic circuits of the power circuit board 42, the electronic circuits of the control circuit board 43, and the power modules 40 and 41 are exposed to the outside of the outside cover member 60.

Further Embodiments

In the above embodiments, the component carrier unit and the outside cover member are formed as separate components from each other. However, the component carrier unit and the outside cover member may be integrally formed as one unit.

In the above embodiments, the nuts are embedded in the holder units and the bolts are screwed to the nuts from the recessed portions of the component carrier unit. However, the bolts may be embedded in the holder units and the nuts may be fixed to the bolts from the recessed portions of the holder units. In such a modification, the bolts correspond to the first connecting members, while the nuts correspond to the second connecting members.

As above, the present disclosure should not be limited to the above embodiments but may be modified in various manners without departing from the spirit of the present disclosure.

What is claimed is:
1. A driving apparatus comprising:
    a motor unit having:
        a cylindrical motor casing for forming an outer flume;
        a stator provided in a radial inside of the motor casing and having multiple-phase windings wound on the stator; and
        a rotor rotatably accommodated in a radial inside of the stator;
    a control unit having;
        driving elements for supplying electric power to the windings of the stator;

circuit boards having electronic circuits electrically connected to the driving elements; and a housing covering and protecting the electronic circuits, wherein the control unit is detachably attached to an axial end of the motor casing, multiple circuit-board terminals electrically connected to the electronic circuits formed on the circuit boards;

multiple motor terminals electrically connected to the respective windings of the stator, wherein each motor terminal extends toward the corresponding circuit-board terminal;

multiple connecting devices, by means of which the motor terminal is connected to or disconnected from the corresponding circuit-board terminal in an inside or at an outside of the housing, in a condition than the electronic circuits are covered by the housing; and holder units for holding the motor terminals, wherein each of the connecting devices has a first connecting member, which is composed of either one of a bolt and a nut, and a second connecting member, which is composed of the other one of the bolt and the nut, wherein the first connecting member is supported by the holder unit together with the motor terminal, and wherein the second connecting member is connected to the first connecting member in a screw-fitting manner, in order that the circuit-board terminal and the motor terminal are interposed between the first and second connecting members and thereby the circuit-board terminal and the motor terminal are connected to each other.

2. The driving apparatus according to claim 1, wherein the housing covers the circuit boards, the driving elements, the circuit-board terminals, the motor terminals and the holder units, and the second connecting member is attached from the outside of the housing to the first connecting member supported by the holder unit provided in the inside of the housing, in a condition that the circuit boards, the driving elements, the circuit-board terminals, the motor terminals and the holder units are covered by the housing.

3. The driving apparatus according to claim 1, wherein the housing is composed of;

a component carrier unit having holder supporting portions for respectively supporting the holder units; and an outside cover member for covering an outer periphery of the component carrier unit.

4. The driving apparatus according to claim 3, wherein the component carrier unit has recessed portions, each of which is recessed in an axial direction of the motor unit toward the motor casing, multiple through-holes are formed at a bottom of each recessed portion, so that an outside and an inside of the component carrier unit are communicated to each other through the through-holes, and each of the second connecting members is attached to the bottom of the recessed portion from the outside of the component carrier unit and connected to the first connecting member provided in the inside of the component carrier unit in the screw-fitting manner.

5. The driving apparatus according to claim 4, further comprising:

cap members for closing respective openings, each of which is formed in the outside cover member at such a position corresponding to the recessed portion of the component carrier unit.

6. The driving apparatus according to claim 3, wherein the component carrier unit has a fixing portion for fixing the circuit-board terminals to the component carrier unit, and the fixing portion and the holder supporting portion are integrally formed with each other.

7. The driving apparatus according to claim 1, wherein the housing covers the circuit boards and the driving elements, while the circuit-board terminals, the motor terminals and the holder units are arranged at an outside of the housing, and the second connecting member is connected to the first connecting member at the outside of the housing, in a condition that the circuit boards and the driving elements are covered by the housing.

* * * * *